United States Patent
Tsukada (10) Patent No.: US 8,363,153 B2
(45) Date of Patent: Jan. 29, 2013

(54) FOCUS DETECTION DEVICE

(75) Inventor: Shinichi Tsukada, Yokohama (JP)

(73) Assignee: Nikon Corporation, Tokyo (JP)

( * ) Notice: Subject to any disclaimer, the term of this patent is extended or adjusted under 35 U.S.C. 154(b) by 184 days.

(21) Appl. No.: 13/017,761

(22) Filed: Jan. 31, 2011

(65) Prior Publication Data

US 2011/0273608 A1 Nov. 10, 2011

(30) Foreign Application Priority Data

Feb. 10, 2010 (JP) ................................. 2010-027296

(51) Int. Cl.
*H04N 5/232* (2006.01)
(52) U.S. Cl. ....................................... 348/350; 348/349
(58) Field of Classification Search .................. 348/345, 348/349, 350, 351, 346, 347, 348
See application file for complete search history.

(56) References Cited

U.S. PATENT DOCUMENTS

| | | | |
|---|---|---|---|
| 5,347,340 A | | 9/1994 | Tsukada |
| 7,822,334 B2 * | | 10/2010 | Ono et al. ..................... 396/128 |
| 8,218,962 B2 * | | 7/2012 | Fujii et al. ..................... 396/100 |
| 2009/0115882 A1 * | | 5/2009 | Kawarada ..................... 348/340 |
| 2011/0008033 A1 * | | 1/2011 | Ichimiya ........................ 396/121 |

FOREIGN PATENT DOCUMENTS

| | | |
|---|---|---|
| JP | B2-3214099 | 10/2001 |
| JP | A-2007-317951 | 12/2007 |
| JP | A-2009-9005 | 1/2009 |
| JP | A-2009-128843 | 6/2009 |

OTHER PUBLICATIONS

Jan. 17, 2012 Office Action issued in Japanese Patent Application No. 2010-027296 (with translation).

\* cited by examiner

*Primary Examiner* — Tuan Ho
*Assistant Examiner* — Chan Nguyen
(74) *Attorney, Agent, or Firm* — Oliff & Berridge, PLC (57) ABSTRACT

A focus detection device includes: a defocus information detection unit that detects phase difference information indicating a phase difference manifested by a pair of images formed with a pair of light fluxes having passed through different areas of a photographic optical system and detects defocus information based upon the phase difference information; and a correction unit that executes correction for correcting the defocus information, detected by the defocus information detection unit, in correspondence to a predetermined direction extending between a first direction that orthogonally intersects an optical axis of the photographic optical system and radially extends from the optical axis and a second direction that orthogonally intersects the first direction.

7 Claims, 10 Drawing Sheets

FOCUS DETECTION DEVICE

INCORPORATION BY REFERENCE

The disclosure of the following priority application is herein Incorporated by reference: Japanese Patent Application No. 2010-027296 filed Feb. 10, 2010

BACKGROUND OF THE INVENTION

1. Field of the Invention

The present invention relates to a focus detection device.

2. Description of Related Art

A focus detection device in the known art detects the focusing condition achieved by a photographic optical system based upon a phase difference (often referred to as an image shift) manifested by a pair of images formed with a pair of focus detection light fluxes having passed through different areas of the photographic optical system. Such a focus detection device adopting the phase detection method is known to give varying focusing condition detection results in correspondence to different phase difference detection directions due to the field curvature manifesting at the photographic optical system (see Japanese Laid Open Patent Publication No. 2009-128843). In more specific terms, the phase difference detected along a straight line (tangential direction) radially extending from the optical axis of the photographic optical system does not match the phase difference detected along a direction (radial direction) orthogonally intersecting the tangential direction on a concentric circle centered on the optical axis.

SUMMARY OF THE INVENTION

In the related art, a focusing operation is executed by detecting contrast information pertaining to the two directions orthogonally intersecting each other, in addition to the phase difference information for the two directions, and weighting the phase difference information for the two directions based upon the contrast ratio of the contrast values corresponding to the two directions. Accordingly, both the phase difference information and the contrast information need to be obtained in correspondence to the two directions in a focus detection area in the prior art.

According to the 1st aspect of the present invention, a focus detection device comprises: a defocus information detection unit that detects phase difference information indicating a phase difference manifested by a pair of images formed with a pair of light fluxes having passed through different areas of a photographic optical system and detects defocus information based upon the phase difference information; and a correction unit that executes correction for correcting the defocus information, detected by the defocus information detection unit, in correspondence to a predetermined direction extending between a first direction that orthogonally intersects an optical axis of the photographic optical system and radially extends from the optical axis and a second direction that orthogonally intersects the first direction.

According to the 2nd aspect of the present invention, in the focus detection device according to the 1st aspect, it is preferred that the correction unit executes the correction based upon a phase difference detection direction along which the phase difference manifested by the pair of images is detected by the defocus information detection unit and an image height of the pair of images.

According to the 3rd aspect of the present invention, in the focus detection device according to the 2nd aspect, it is preferred that the correction unit executes the correction by using correction information corresponding to a first relative angle indicating the phase difference detection direction relative to the first direction and corresponding to the image height read out from a memory where the correction information is stored in advance.

According to the 4th aspect of the present invention, in the focus detection device according to the 3rd aspect, it is preferred that the predetermined direction is equivalent to an angle that is half a second relative angle formed by the second direction relative to the first direction.

According to the 5th aspect of the present invention, in the focus detection device according to the 4th aspect, it is preferred that the angle that is half of the second relative angle is substantially equal to the first relative angle.

According to the 6th aspect of the present invention, in the focus detection device according to the 3rd aspect, it is preferred that the correction information corresponding to the first relative angle and the image height is stored in the memory in correspondence to each of zoom positions that may be assumed by the photographic optical system or each of distance positions that may be assumed by the photographic optical system; and the correction unit executes the correction by reading out from the memory the correction information corresponding to the each of distance positions or the each of zoom positions.

According to the 7th aspect of the present invention, a focus detection device comprises: an image sensor that include's a focus detection pixel row, which outputs a pair of images formed with light fluxes resulting from pupil splitting achieved at an exit pupil of an optical system; an image shift amount calculation unit that calculates an image shift amount indicating an extent of image shift manifested by the pair of images along an alignment direction assumed for the focus detection pixel row; a defocus amount calculation unit that calculates a defocus amount based upon the image shift amount calculated by the image shift amount calculation unit; a storage unit, in which a coefficient that defines a relationship between an field curvature manifesting at the optical system and an image height indicating a distance from an optical axis of the optical system to the focus detection pixel row that outputs the pair of images is stored; a correction value calculation unit that calculates a correction value for the defocus amount based upon the image height, a relative angle formed by a straight line extending from the optical axis toward the focus detection pixel row that outputs the pair of images and the alignment direction, and the coefficient stored in the storage unit; and a drive quantity calculation unit that calculates a drive quantity indicating an extent to which the optical system needs to be driven to achieve focus adjustment for the optical system, based upon the defocus amount calculated by the defocus amount calculation unit and the correction value calculated by the correction value calculation unit.

DESCRIPTION OF PREFERRED EMBODIMENTS

Figure 1:
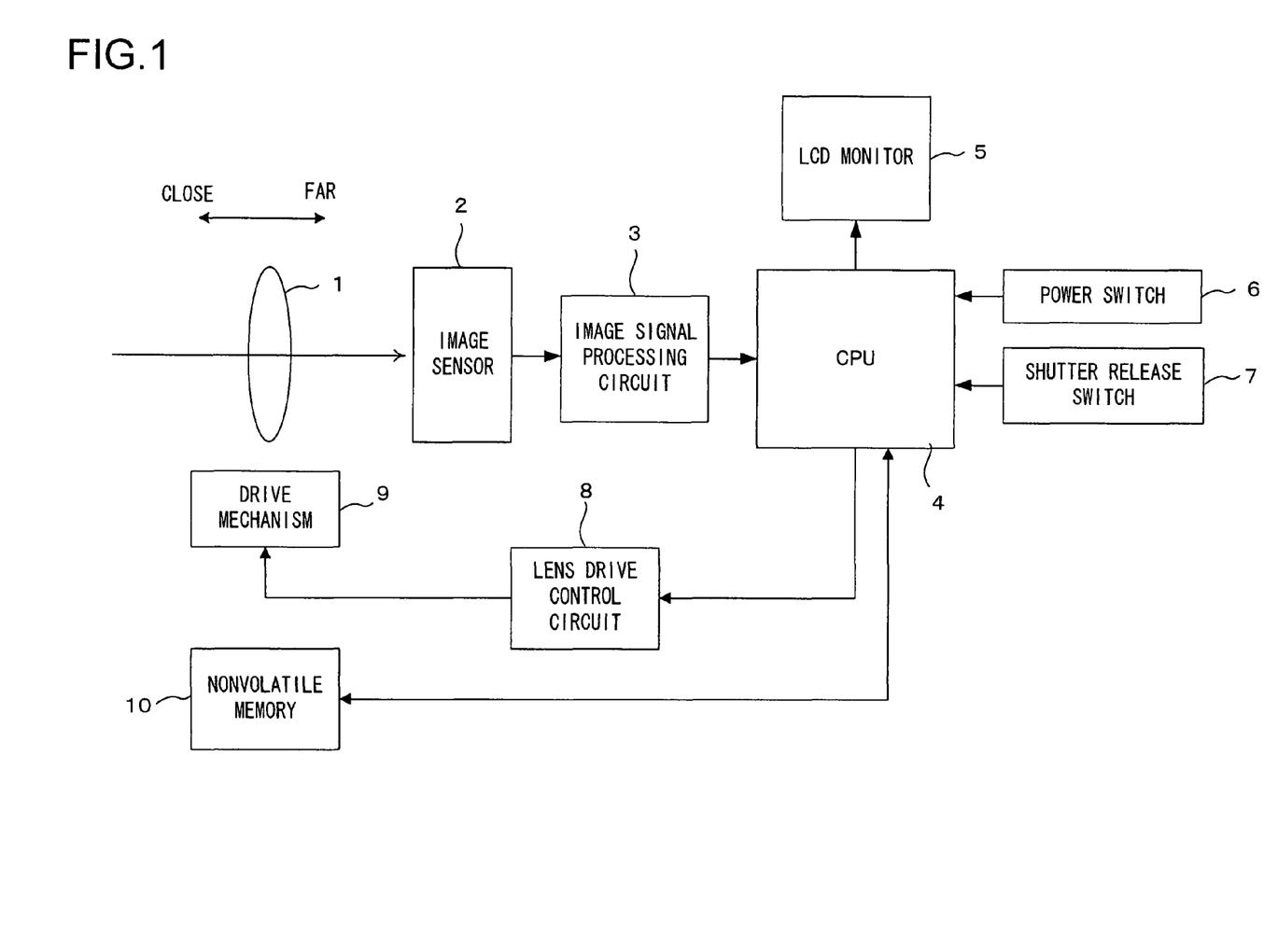
FIG. 1 is a block diagram showing the essential structure of an electronic camera that may include the focus detection device achieved in an embodiment of the present invention.

The following is a description of an embodiment of the present invention, given in reference to drawings. FIG. 1 is a block diagram showing the essential structure adopted in an electronic camera equipped with the focus detection device achieved in the embodiment of the present invention. The electronic camera is controlled by a CPU 4.

A photographic lens 1 forms a subject image on an image-capturing plane of an image sensor 2. The image sensor 2 may be, for instance, a CMOS image sensor. The image sensor 2 captures the subject image and outputs analog image signals to an image signal processing circuit 3. The image signal processing circuit 3 includes an AFE (Analog Front End) circuit, an A/D conversion circuit and a signal processing circuit.

The AFE circuit executes analog processing, such as correlation double sampling and gain adjustment, on the analog image signals. The A/D conversion circuit converts the image signals having undergone the analog processing to digital image data. The digital image data then undergo image processing at the signal processing circuit. The image processing executed on the digital image data may include, for instance, γ conversion processing, edge enhancement processing, filter processing, white balance adjustment processing, format conversion processing and image compression/decompression processing.

The CPU 4 executes predetermined calculations by using signals output from various blocks within the camera and input thereto and outputs control signals generated based upon the calculation results to the individual blocks. The CPU 4 further executes phase difference calculation in order to determine the focusing condition (defocus amount) for the photographic lens 1. The phase difference calculation will be described in detail later.

At an LCD monitor 5, a captured image or an operation menu is brought up on display in response to an instruction issued by the CPU 4. A power switch 6, which enters an ON state or an OFF state by interlocking with a depression of a power button (not shown), outputs an ON operation signal or an OFF operation signal to the CPU 4.

A shutter release switch 7 enters an ON state or an OFF state by interlocking with depression of a shutter release button (not shown). As the shutter release button is pressed halfway down, the shutter release switch 7 outputs a halfway press operation signal to the CPU 4, whereas it outputs a full press operation signal to the CPU 4 if the shutter release button is pressed all the way down.

In response to an instruction issued by the CPU 4, a lens drive control circuit 8 outputs a lens drive signal (a signal indicating a specific lens drive direction and a specific lens drive extent (quantity, amount)) to a drive mechanism 9. In response to the lens drive signal, the drive mechanism 9 moves a focusing lens constituting the photographic lens 1 forward/backward along the optical axis, until a focus match state is achieved for the electronic camera.

Information indicating the optical characteristics of the photographic lens 1 is stored in a nonvolatile memory 10. The CPU 4 corrects the lens drive quantity based upon information read out from the nonvolatile memory 10. The lens drive quantity correction is to be described in detail later.

The following is a detailed description of autofocus adjustment processing executed by the CPU 4. The image sensor 2 in the embodiment includes rows of focus detection pixels. The image sensor 2 is similar to the image sensor described in Japanese Laid Open Patent Publication No. 2007-317951. The CPU 4 executes focus detection processing through phase difference detection calculation executed in conjunction with pixel output data provided from focus detection pixels. The CPU 4 detects an image shift amount, i.e., the extent of shift manifested by a pair of images formed with a pair of light fluxes having passed through different areas of the photographic lens 1, detects a defocus amount, indicating the extent of defocusing, based upon the shift amount, and drives the focusing lens by the extent indicated by the lens drive quantity, which is equivalent to the defocus amount, by issuing an instruction to the lens drive control circuit 8.

Figure 2:
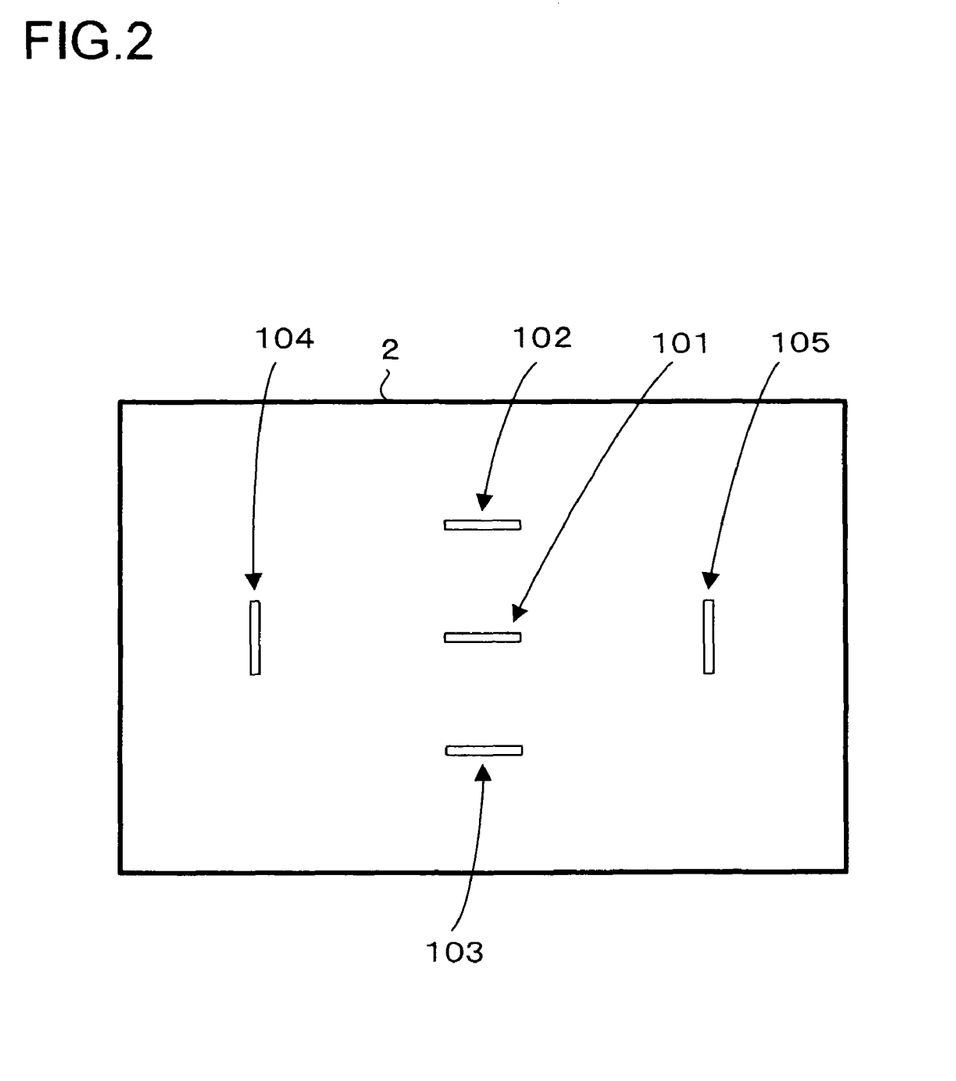
FIG. 2 indicates the positions assumed by focus detection pixel rows formed at the image sensor.

FIG. 2 indicates the positions assumed by the focus detection pixel rows formed at the image sensor 2. FIG. 2 shows five rectangular areas 101 to 105 present within the effective image-capturing area of the image sensor 2. Focus detection pixels are disposed in a linear formation along the longer sides of the rectangular areas. In other words, focus detection pixels are formed inside the areas 101 to 105, whereas image-capturing pixels are formed outside the areas 101 to 105.

Figure 3:
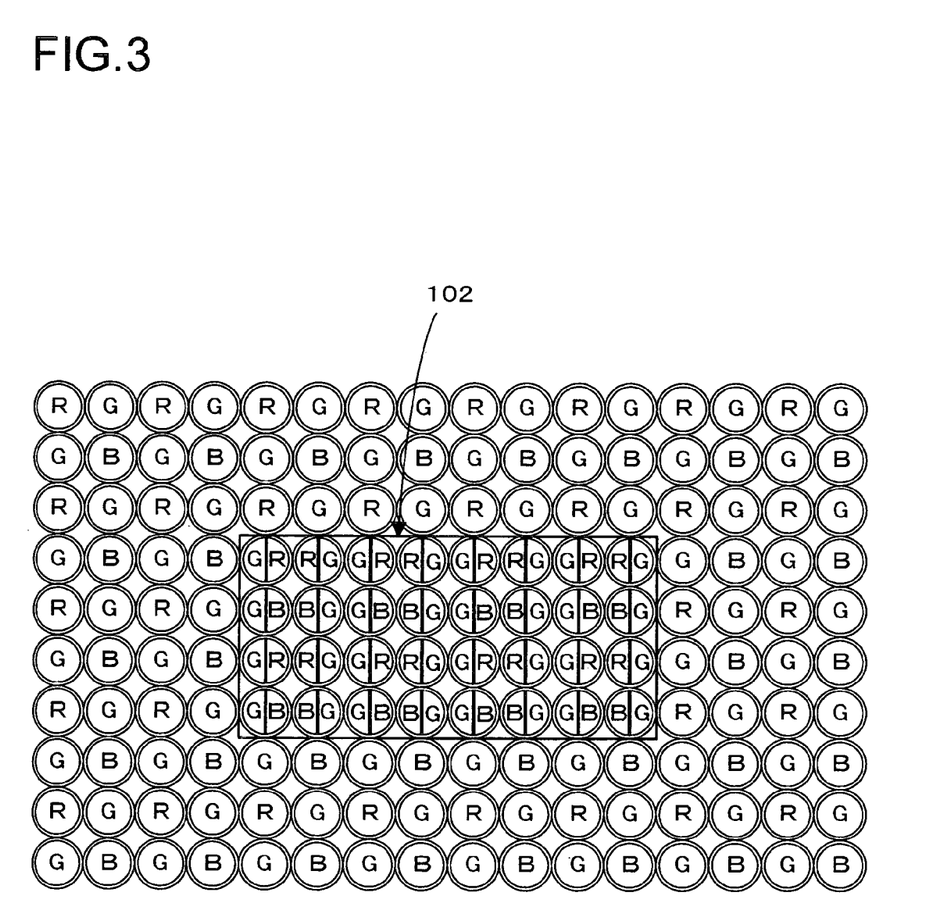
FIG. 3 presents an enlarged view of a focus detection pixel area and image-capturing pixels disposed around the focus detection pixel area.

FIG. 3 presents an enlarged view of the focus detection pixels in the horizontally elongated area 102 and image-capturing pixels present around the area 102 as an example.

Figure 4A:
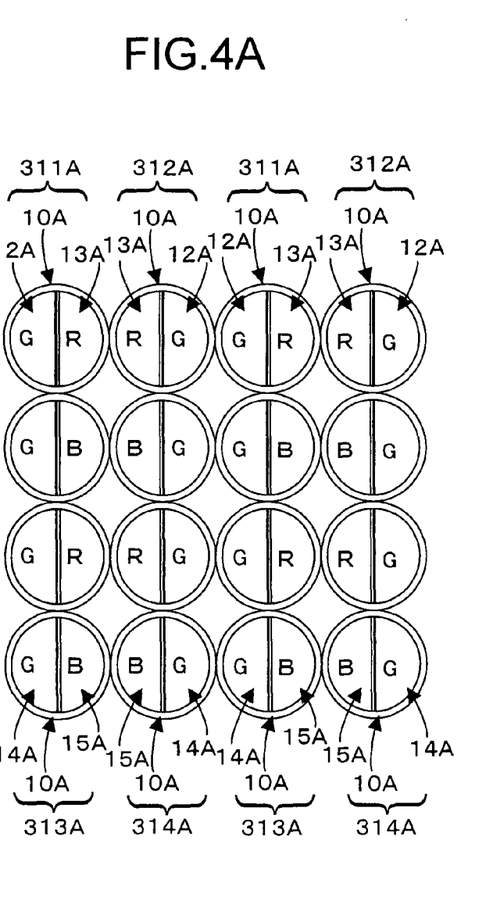
FIGS. 4A and 4B each present an enlarged view of focus detection pixels alone.
Figure 4B:
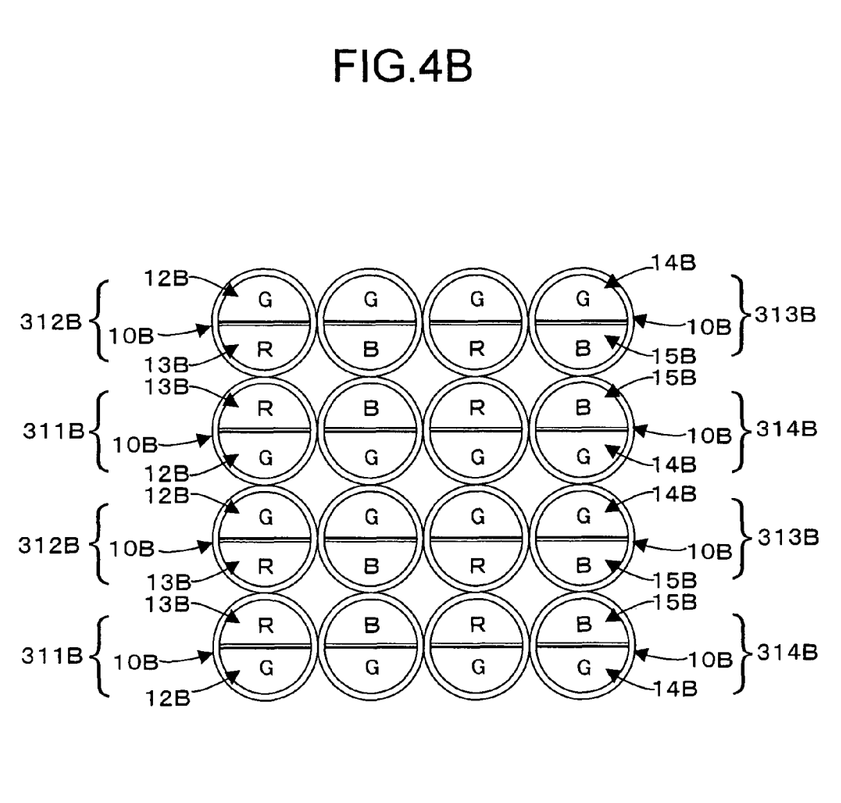
Figure 5:
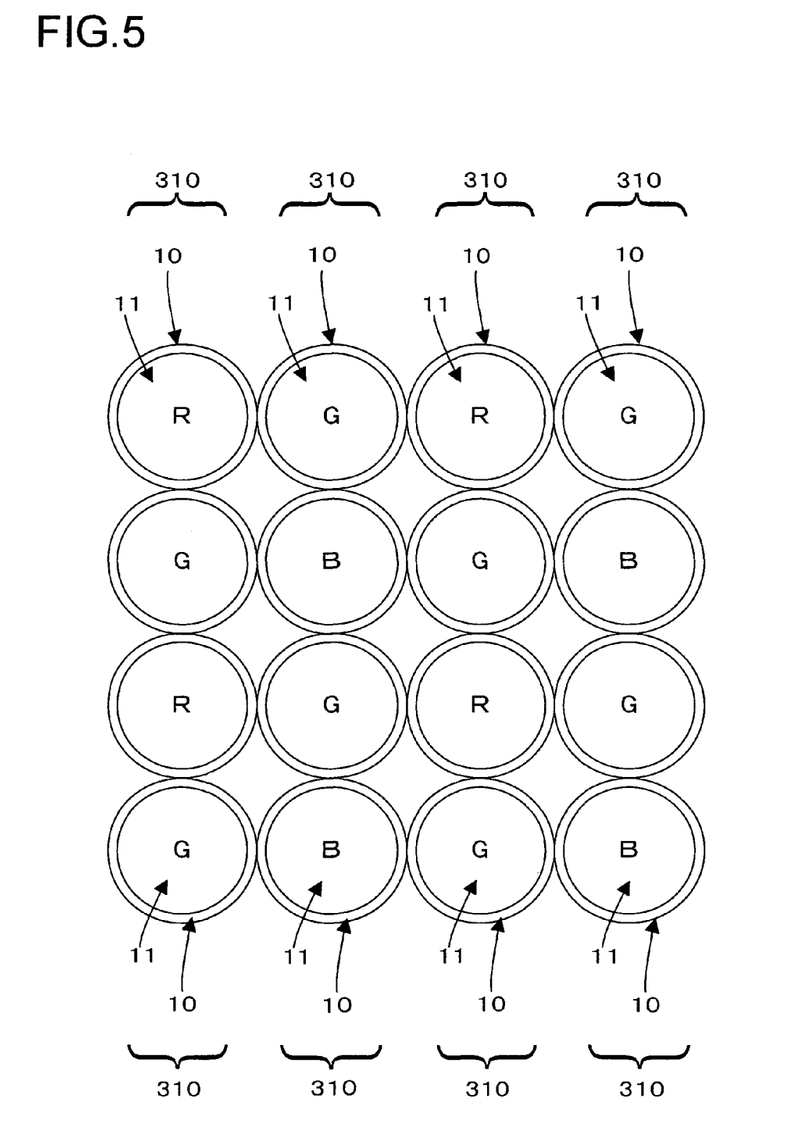
FIG. 5 presents an enlarged view of image-capturing pixels alone.

FIGS. 4A and 4B each present an enlarged view of the focus detection pixels alone, whereas FIG. 5 presents an enlarged view of the image-capturing pixels alone.

Focus detection pixels 311A and focus detection pixels 312A in FIG. 4A each include a micro lens 10A and a pair of photoelectric conversion units 12A and 13A. The two photoelectric conversion units 12A and 13A, each assuming a semicircular shape, are disposed so as to achieve left/right symmetry relative to the center of the micro-lens 10A. A green (G) color filter is formed at one (the photoelectric conversion unit 12A) of the two photoelectric conversion units in the pair, whereas a red (R) color filter is formed at the other photoelectric conversion unit 13A. The focus detection pixels 311A and the focus detection pixels 312A assume reverse color filter positional arrangements relative to each other.

Likewise, focus detection pixels 313A and focus detection pixels 314A each include a micro lens 10A and a pair of photoelectric conversion units 14A and 15A. The two photoelectric conversion units 14A and 15A, each assuming a semicircular shape, are disposed so as to achieve left/right symmetry relative to the center of the micro-lens 10A. A G color filter is formed at one (the photoelectric conversion unit 14A) of the two photoelectric conversion units in the pair, whereas a blue (B) color filter is formed at the other photoelectric conversion unit 15A. The focus detection pixels 313A and the focus detection pixels 314A assume reverse color filter positional arrangements relative to each other.

The focus detection pixels 311A and the focus detection pixels 312A are disposed alternately along the direction in which the photoelectric conversion units 12A and 13A in each pair are set side-by-side (along the horizontal direction in FIG. 4A). In addition, the focus detection pixels 313A and the focus detection pixels 314A are disposed alternately along the direction in which the photoelectric conversion units 14A and 15A in each pair are set side-by-side (along the horizontal direction in FIG. 4A).

It is to be noted that semicircular photoelectric conversion units 12B and 13B in a focus detection pixel present in the vertically elongated area 104 or 105 are set so as to achieve up/down symmetry relative to the center of a micro-lens 10B, as shown in FIG. 4B.

In the vertically elongated area, a focus detection pixel 311B and a focus detection pixel 312B are disposed alternately along the direction in which the photoelectric conversion units 12B and 13B in each pair are set (along the vertical direction in FIG. 4B). In addition, a focus detection pixel 313B and a focus detection pixel 314B are disposed alternately along the direction in which the photoelectric conversion units 14B and 15B in each pair are set (along the vertical direction in FIG. 4B).

Image-capturing pixels 310 in FIG. 5 each include a micro lens 10 and a photoelectric conversion unit 11. Color filters, each assuming one of three colors, B and R set so as to achieve a Bayer array, are each formed at one of the photoelectric conversion units 11. The image-capturing pixels 310 are all structurally identical except that the color of the color filter formed at one image-capturing pixel is different from the color of the color filter formed at an adjacent image-capturing pixel.

In the structure described above, light fluxes resulting from pupil splitting enter the focus detection pixels, as described in Japanese Laid Open Patent Publication No. 2007-317951. More specifically, a focus detection pixel 311A achieves a state equivalent to having substantially half of the surface of the micro-lens 10A on its right side shielded from G-color component light. At the photoelectric conversion unit 12A, where the light flux from the right-side surface does not enter, a light flux (to be referred to as an A component) from the leftward direction enters. A focus detection pixel 312A, on the other hand, achieves a state equivalent to having substantially half of the surface of the micro-lens 10A on its left side shielded from G-color component light. At the photoelectric conversion unit 12A, where the light flux from the left-side surface does not enter, a light flux (to be referred to as a B component) from the rightward direction enters.

Consequently, the pixel outputs (an A component data string) obtained from a pixel group made up with focus detection pixels 311A, at which A component light fluxes enter, express images formed with light fluxes having entered the focus detection pixels after passing through an area accounting for half of an exit pupil of the photographic lens 1, whereas the pixel outputs (a B component data string) obtained from a pixel group made up with focus detection pixels 312A, at which B component light fluxes enter, express images formed with light fluxes having entered the focus detection pixels after passing through an area accounting for the other half of the exit pupil of the photographic lens 1.

The CPU 4 calculates the extent of image shift (to be referred to as a shift amount) manifested by the two data strings and a correlation value indicating the level of correlation between the A component data string and the B component data string by shifting the relative positions of the A component data string and the B component data string so as to alter their positional relationship. A smaller correlation value indicates that the two data strings achieve a higher level of correlation. An arithmetic operation is executed to determine the shift amount at which the smallest correlation value is achieved through a phase difference detection operation of the known art.

The CPU 4 multiplies the shift amount at which the smallest correlation value is achieved by a predetermined coefficient so as to calculate the defocus amount (the extent of offset manifested by the subject image plane and a predetermined focusing plane).

The CPU 4 corrects the defocus amount as described below by using information read out from the nonvolatile memory 10. Expression (1) below approximates a curvature R along the radial direction as a function of the image height r (the distance to the pair of images from the optical axis at the image plane). The radial field curvature R is equivalent to a curvature component manifesting along a tangential line of a concentric circle centered on the optical axis. In addition, expression (2) below approximates a curvature T along the tangential direction as a function of the image height r. The tangential field curvature T is equivalent to a curvature component manifesting along a straight line radially extending from the optical axis toward the pair of images in a direction that orthogonally intersects the radial direction.

$$R(r) = a4 \cdot r^4 + a2 \cdot r^2 \tag{1}$$

$$T(r) = b4 \cdot r^4 + b2 \cdot r^2 \tag{2}$$

Figure 6:
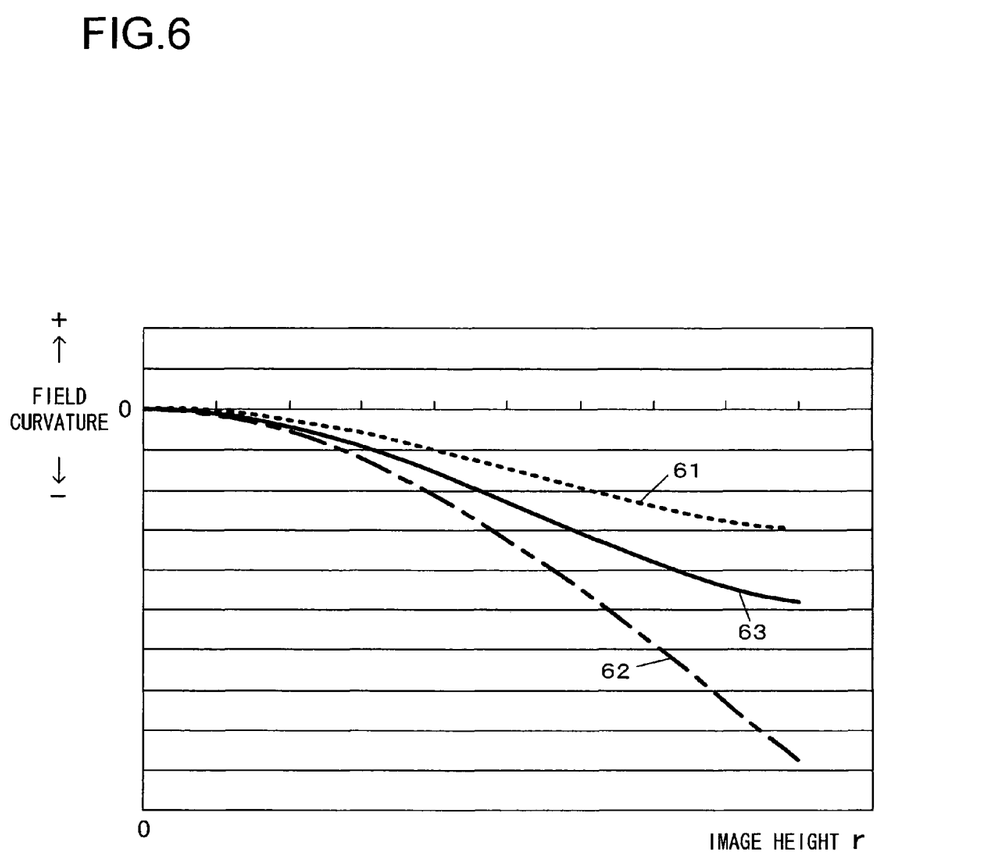
FIG. 6 presents examples of the field curvature R and the field curvature T.

Expressions (1) and (2) above indicate that the field curvature R and the field curvature T both assume a value of 0 on the optical axis and both assume greater values as the image height r increases. FIG. 6 presents examples of the field curvature R and the field curvature T. The image height r is indicated along the horizontal axis and the field curvatures are indicated along the vertical axis in FIG. 6. In addition, a dotted line 61 represents the field curvature R, whereas a one-point chain line 62 represents the field curvature T. FIG. 6 indicates that the field curvature T changes at a higher rate than the field curvature R in correspondence to the increase in the image height r.

The presence of the field curvature R and the field curvature T, examples of which are presented in FIG. 6, alters the shift amount detected at a given image height r, depending upon the direction in which the focus detection pixels are arrayed in the focus detection area 102, 103, 104 or 105 (see FIG. 2) (i.e., depending upon the direction in which the shift amount representing the extent of shift manifested by the A component data string and the B component data string is detected). For instance, the focus detection pixels in the areas 102 through 105 (see FIG. 2) are all set along the radial direction, and thus, the shift amount calculated by using the pixel output data from any of the areas 102 to 105 is invariably affected by the field curvature R.

The shift amount calculated by using pixel output data provided from focus detection pixels set along the tangential direction, on the other hand, will invariably be affected by the field curvature T. For this reason, the difference between the field curvature represented by the dotted line 61 and the field curvature represented by the one-point chain line 62 will manifest as a shift amount detection error. This means that the focusing position resulting from focus adjustment executed by directly utilizing the detected shift amount will be affected by the focus detection pixel alignment direction (shift amount detection direction).

Accordingly, the defocus amount calculated through the phase difference detection operation is corrected to a defocus amount value that will be assumed if the focus detection pixels are set along a predetermined direction (if the shift amount is detected along the predetermined direction), so as to reduce the error attributable to the focus detection pixel alignment direction (shift amount detection direction) and the field curvatures R and T.

The predetermined direction set for the correction described above is selected as described below in the embodiment. Namely, assuming that the focus detection pixel alignment direction (shift amount detection direction) is indicated by a relative angle θ (unit; deg) in reference to the tangential direction, the predetermined direction is defined as; θ=45 (deg). 45(deg) represents the direction equivalent to half of the angle formed by the tangential direction (θ=0(deg)) and the radial direction (θ=90(deg)).

A correction value H used to correct the defocus amount to a defocus amount value corresponding to θ=45(deg) can be approximated as a function of the image height r and the relative angle θ, as expressed in (3) below if θ≧45(deg) and as expressed in (4) below if θ<45(deg). Expressions (3) and (4) are each an approximate expression obtained by statistically processing groups of data indicating focusing positions calculated in conjunction with a plurality of photographic lenses.

$$H(r, \theta) = R(r) \cdot \sin(2 \cdot (\theta - 45)) \quad (3)$$

$$H(r, \theta) = T(r) \cdot \sin(2 \cdot (45 - \theta)) \quad (4)$$

r in expressions (3) and (4) above represents the image height (the distance to the pair of images from the optical axis at the image plane). The field curvature R (r) is the curvature along the radial direction calculated as expressed in (1), whereas the field curvature T (r) is a curvature along the tangential direction calculated as expressed in (2). It is to be noted that a solid-line curve 63 in FIG. 6 represents the field curvature at θ=45(deg).

Figure 7:
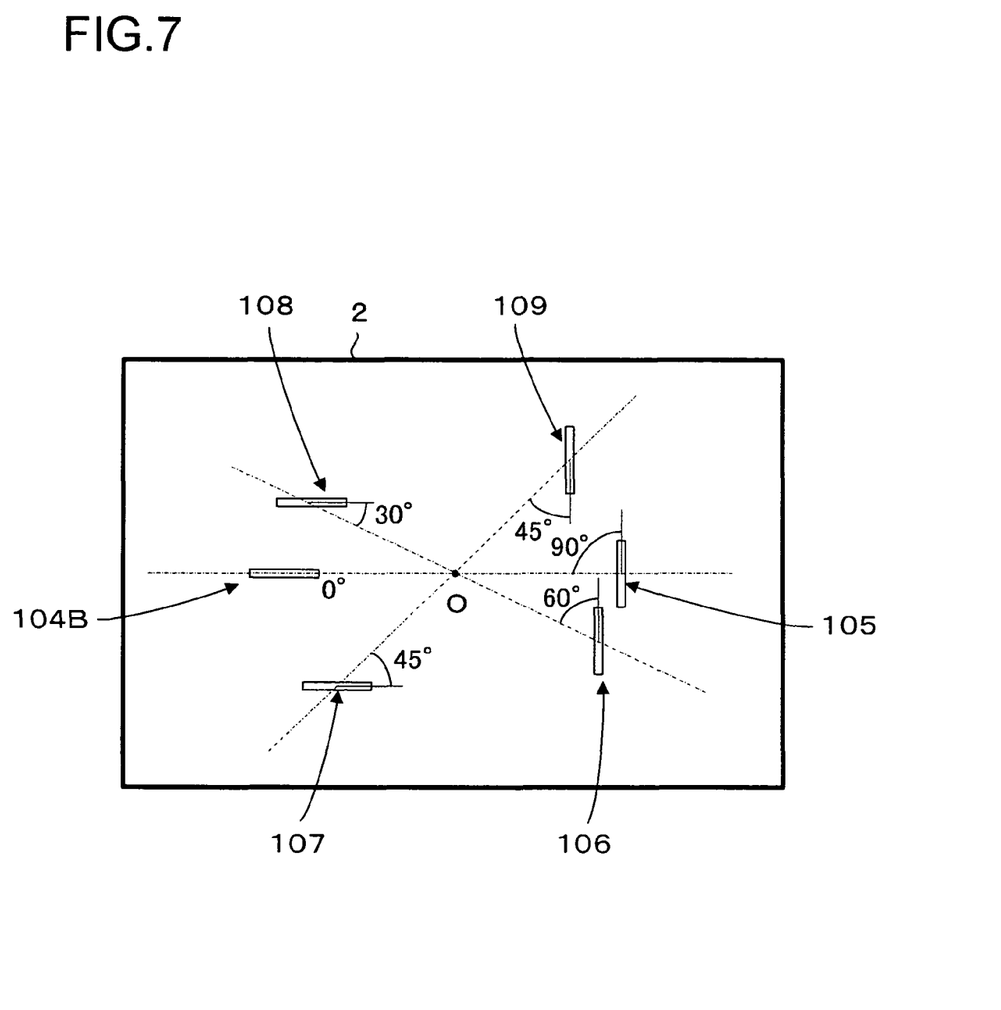
FIG. 7 presents an example of a relationship that may manifest between the value of the relative angle θ and the focus detection pixel alignment direction.

FIG. 7 presents an example of a relationship that may manifest between the value of the relative angle θ and the focus detection pixel alignment direction (shift amount detection direction). A point O indicates the position equivalent to the optical axis of the photographic lens 1, assumed at the center of the image-capturing plane of the image sensor 2. The alignment direction in which the focus detection pixels corresponding to an area 105 identical to the area 105 in FIG. 2 are arrayed is defined as θ=90(deg) relative to the tangential direction, i.e., the focus detection pixels are arrayed along the radial direction. The alignment direction in which the focus detection pixels corresponding to an area 106 are arrayed is defined as θ=60(deg) relative to the tangential direction. The alignment direction in which the focus detection pixels corresponding to an area 107 are arrayed is defined as θ=45(deg) relative to the tangential direction, matching the predetermined direction selected for defocus amount correction as described earlier. In this case, the correction quantity will be 0 as is obvious from expressions (3) and (4).

Likewise, the alignment direction in which the focus detection pixels corresponding to an area 104B are arrayed is defined as θ=0(deg) relative to the tangential direction, i.e., the focus detection pixels are arrayed along the tangential direction. The alignment direction in which the focus detection pixels corresponding to an area 108 are arrayed is defined as θ=30(deg) relative to the tangential direction. The alignment direction in which the focus detection pixels corresponding to an area 109 are arrayed is defined as θ=45(deg) relative to the tangential direction, matching the predetermined direction selected for defocus amount correction as described earlier. In this case, the correction quantity will be 0 as is obvious from expressions (3) and (4).

As indicated in FIG. 7, focus detection pixels may be arrayed along directions (shift amount detection directions) corresponding to various angles, depending upon the camera specifications (i.e., the directions along which focus detection pixels are disposed and the positions assumed by the focus detection pixels at the image sensor 2). By correcting the defocus amount as in the embodiment, uniformity can be achieved in the focusing position resulting from the focus adjustment, regardless of the direction in which the shift amount is detected.

The correction values H (r, θ) calculated as expressed in (3) and (4) above each represent the difference from field curvature manifesting at θ=45(deg). Accordingly, a corrected defocus amount can be determined by adding the correction value H (r, θ) calculated as expressed in (3) or (4), i.e., the expression selected in correspondence to the value of the relative angle θ, to the defocus amount obtained through the phase difference detection operation.

Figure 8:
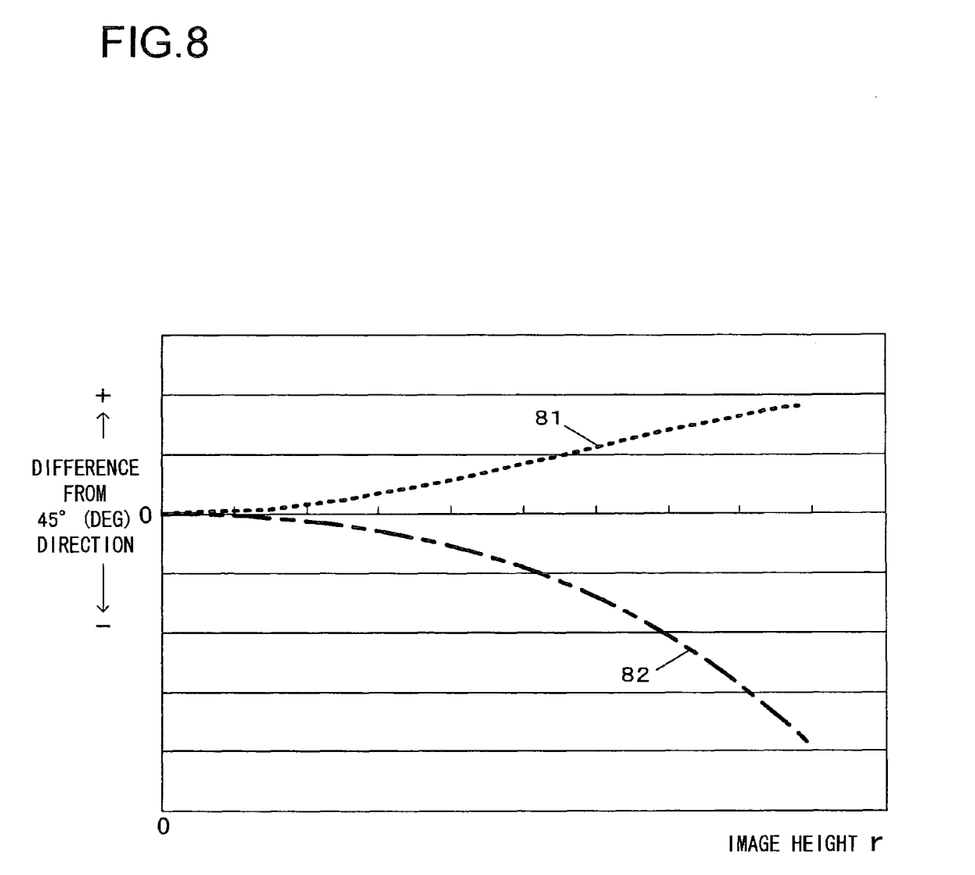
FIG. 8 presents examples of the correction value H (r, θ).

FIG. 8 presents examples of correction values H (r, θ) calculated as expressed in (3) and (4) above. The image height r is indicated along the horizontal axis and the field curvature differences are indicated along the vertical axis in FIG. 8. A dotted line 81 represents the difference between the field curvature R and the field curvature that would manifest at θ=45(deg) (the difference between the curve 61 and the curve 63 in FIG. 6), whereas a one-point chain line 82 represents the difference between the field curvature T and the field curvature that would manifest at θ=45(deg) (the difference between the curve 62 and the curve 63 in FIG. 6). FIG. 8 indicates that when θ is equal to or greater than 45(deg), the correction value H (r, θ) assumes a positive value, whereas when θ is less than 45(deg), the correction value H (r, θ) assumes a negative value.

Information pertaining to expression (1) to (4) is stored in advance in the nonvolatile memory 10. Under normal circumstances, the center of the image-capturing plane of the image sensor 2 is equivalent to the optical axis of the photographic lens 1. The CPU 4 calculates the field curvature R (r) along the radial direction and the field curvature T (r) along the tangential direction by using the specific image height value r representing the distance from the center of the image-capturing plane to the focus detection pixels respectively in expressions (1) and (2) for substitution.

If a plurality of areas (i.e., AF areas) are set within the photographic image plane for purposes of focus adjustment, information indicating the relative angle θ corresponding to the pixel alignment direction (i.e., the shift amount detection direction) and the image height r should also be stored in advance in the nonvolatile memory 10 in correspondence to each AF area. Once a specific AF area is selected for focus adjustment, the CPU 4 will read out the data indicating the relative angle θ and image height r corresponding to the particular AF area from the nonvolatile memory 10, and will calculate the correction value H (r, θ) by using the relative angle θ and the image height r, having been read out, in expression (3) or (4) for substitution.

The CPU 4 then corrects the defocus amount having been calculated through the phase difference detection operation by adding the correction value H (r, θ) to the initial defocus amount and issues an instruction indicating the corrected defocus amount to the lens drive control circuit 8 so as to drive the focusing lens by the lens drive quantity matching the corrected defocus amount.

Figure 9:
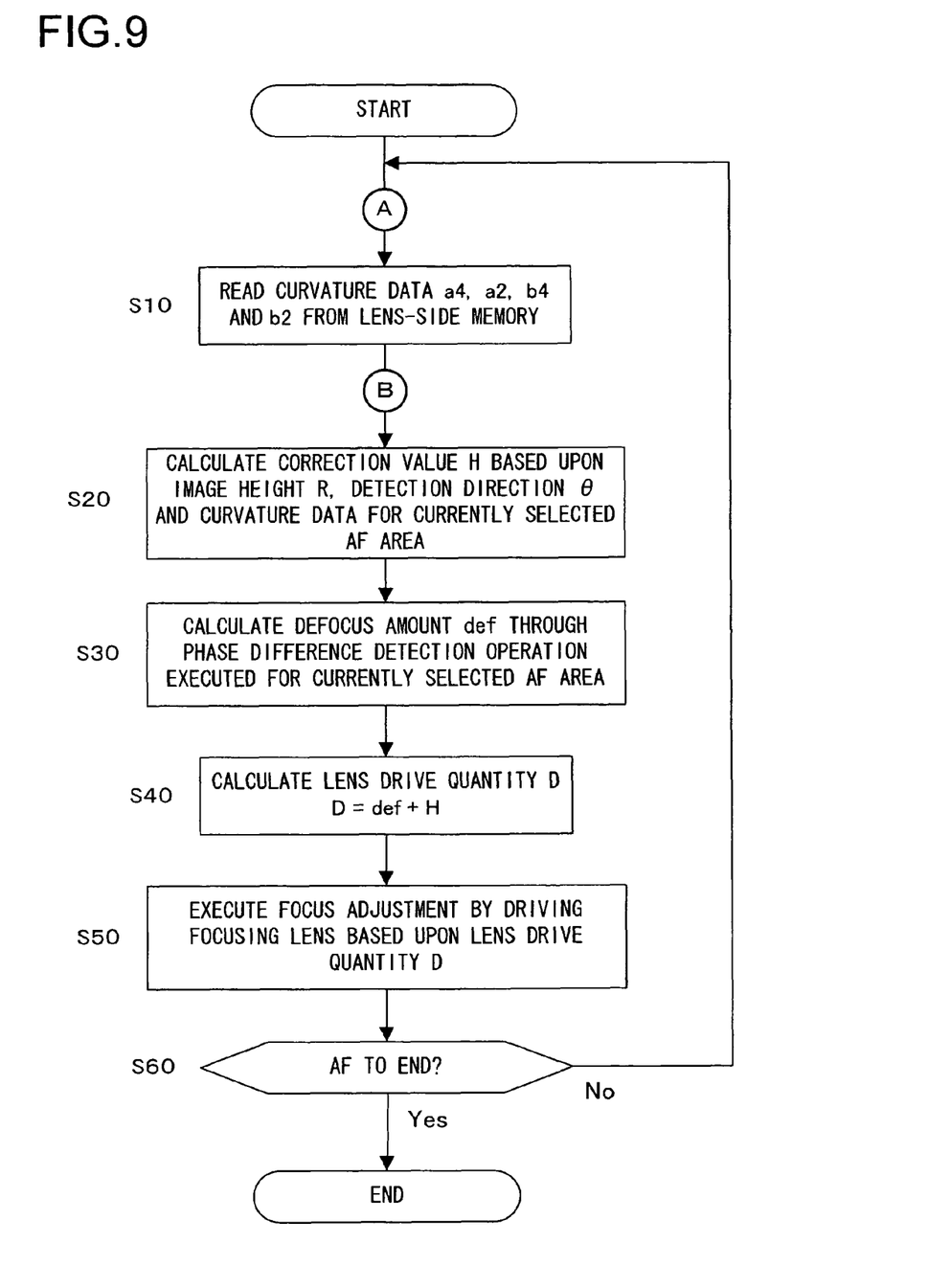
FIG. 9 presents a flowchart of the focus detection processing.

In reference to the AF flowchart presented in FIG. 9, the flow of the focus detection processing described above is explained. The CPU 4 starts up the processing in FIG. 9 in response to, for instance, a halfway press operation of the shutter release button.

In step S10 in FIG. 9, the CPU 4 reads out data (curvature data) indicating the field curvature characteristics of the photographic lens 1 from the nonvolatile memory 10, and then the operation proceeds to step S20. More specifically, it reads out coefficients a4, a2, b4 and b2 in expressions (1) and (2) in step S10.

In step S20, the CPU 4 further reads out from the nonvolatile memory 10, the data indicating the image height r and the relative angle θ corresponding to the selected AF area and also calculates the field curvature R (r) and the field curvature T (r) by using the image height value r having been read out in expressions (1) and (2) for substitution. Then it calculates the correction value H (r, θ) by using either the field curvature R (r) or the field curvature T (r) in expression (3) or expression (4) for substitution depending upon the relative angle θ, and then the operation proceeds to step S30.

In step S30, the CPU 4 executes phase difference detection operation by using the pixel output data provided from the focus detection pixels present in the selected AF area and thus determines the shift amount. Then, it calculates a defocus amount def by multiplying the shift amount by a predetermined coefficient, before the operation proceeds to step S40.

In step S40, the CPU 4 calculates a lens drive quantity D by adding the correction value H (r, θ) to the defocus amount def, and then the operation proceeds to step S50. In step S50, the CPU 4 issues an instruction for the lens drive control circuit 8 so as to execute focus adjustment by driving the focusing lens based upon the lens drive quantity D. The operation then proceeds to step S60.

In step S60, the CPU 4 makes a decision as to whether or not to end the AF operation. If an operation for switching AF areas has been performed, the CPU 4 makes a negative decision in step S60 and, in this case, the operation returns to step S10 to repeatedly execute the processing described above. If, on the other hand, no operation for switching AF areas has been performed, the CPU 4 makes an affirmative decision in step S60 and ends the processing presented in FIG. 9.

The following advantages are achieved through the embodiment described above.

(1) The CPU 4 detects a shift amount indicating the extent of image shift manifested by a pair of images formed with a pair of light fluxes having passed through different areas of the photographic lens 1, detects a defocus amount based upon the shift amount and also corrects the defocus amount so as to adjust it to a defocus amount value for defocusing along a predetermined direction assuming an angle between the angle corresponding to a tangential direction orthogonally intersecting the optical axis of the photographic lens 1 and radially extending from the optical axis and the angle corresponding to a radial direction orthogonally intersecting the tangential direction. As a result, optimal focus detection can be achieved simply based upon phase difference information detected along a single direction, without having to detect shift quantities in correspondence to the two directions or having to obtain contrast information in correspondence to the two directions.

When the subject image is formed off the optical axis (when the image height r is not 0), the value of a shift amount detected along a shift amount detection direction closer to the tangential direction and the value of a shift amount detected along a shift amount detection direction closer to the radial direction are normally bound to be different from each other due to the field curvature manifesting at the photographic lens 1. In the embodiment, a defocus amount calculated based upon a shift amount detected along one direction is corrected so as to adjust it to a defocus amount value corresponding to a predetermined direction (e.g., the 45(deg) direction) assuming an angle between the angle corresponding to the tangential direction and the angle corresponding to the radial direction. Thus, regardless of the detection direction, i.e., regardless of whether the detection direction is closer to the tangential direction or the radial direction, the defocus amount can be invariably corrected so as to correspond to the predetermined direction. Consequently, a uniform focusing position can be determined regardless of the shift amount detection direction. It is to be noted that as long as a specific direction is selected for the correction, a direction other than the 45(deg) direction may be set.

A description is given above on an example in which focus detection is executed through an image plane phase detection method in conjunction with the image sensor 2, which includes focus detection pixels. Since the image sensor 2 may include focus detection pixels disposed in an area close to the periphery of the image-capturing plane of the image sensor 2, focus detection may be executed at a large image height through the image plane phase detection method. The present invention will prove particularly effective when adopted in focus detection executed in such a large image height area.

(2) The CPU 4 corrects the defocus amount based upon the shift amount detection direction along which the extent of shift manifested by a pair of images is detected and the image height r of the pair of images, and thus is able to execute optimal correction regardless of the shift amount detection direction and also regardless of whether the detection position is closer to or further away from the optical axis.

(3) The CPU 4 executes the correction by using correction information read out from the nonvolatile memory 10 where the correction information corresponding to the relative angle θ indicating the shift amount detection direction relative to the tangential direction and corresponding to the image height r is stored in advance. Thus, it is able to ascertain an accurate correction quantity simply by using the relative angle θ and the image height r for substitution.

(4) The predetermined direction is equivalent to an angle (=45(deg)) which is half of 90(deg) representing the radial direction relative to the tangential direction. Thus, the correction quantity can be kept down compared to a correction quantity calculated in correspondence to a direction closer to either the tangential direction or the radial direction.

(5) As expressions (3) and (4) clearly indicate, the correction quantity assumes a value of 0 when the shift amount detection direction (the focus detection pixel alignment direction) is defined as θ=45(deg). Since it is bound to take more time to read pixel outputs at the image sensor 2 along a diagonal direction compared to the length of time required for a horizontal read or a vertical read, the pixels in the embodiment are arrayed along the horizontal direction (in the areas 101 to 103) or the vertical direction (in the areas 104 and 105).

(Variation 1) When the present invention is adopted in conjunction with a photographic lens 1 that can be detachably mounted at the camera body, the non-volatile memory 10 should be installed within a lens barrel. In such a case, information pertaining to expressions (1) and (2) should be stored in advance in the non-volatile memory 10. The field curvature, which represents optical characteristics of the photographic lens 1, assumes different values in different photographic lenses. By storing sets of field curvature information for each photographic lens 1 in the nonvolatile memory 10 in the lens barrel, a 1:1 correspondence between the photographic lens 1 and the matching data storage content can be sustained. Through these measures, the defocus amount can be optimally corrected even when the photographic lens 1 is mounted at a different camera body.

The information indicating the relative angle θ ascertained based upon the pixel alignment direction (i.e., the shift amount detection direction) assumed in each AF area and the image height r in the AF area, on the other hand, should be stored in a memory present on the camera body side (e.g., a nonvolatile memory in the CPU 4). Since the relative angle θ and the image height r (pixel interval) indicate characteristics of the image sensor 2 located on the camera body side, different values will be assumed in correspondence to camera bodies equipped with image sensors 2 with different focus detection pixel positional arrangements. Accordingly, by storing the information indicating the relative angle θ and the image height r corresponding to each camera body in the memory present on the camera body side, a 1:1 correspondence between the particular camera body and the matching data storage content can be sustained.

(Variation 2)

Figure 10A:
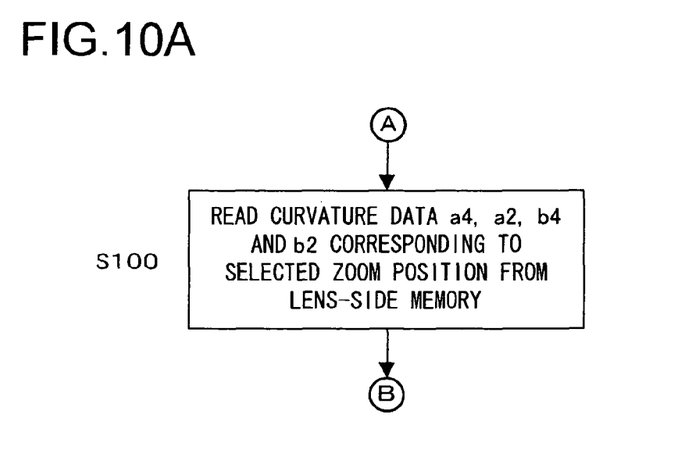
FIGS. 10A and 10B each show a processing step in which photographic lens field curvature data are read out from the nonvolatile memory.

If the photographic lens 1 is a zoom lens, it is desirable to prepare a plurality of sets of information pertaining to expressions (1) and (2) above, each in correspondence to a specific zoom position and to store the plurality of sets of information in the nonvolatile memory 10. Under normal circumstances, it is difficult to achieve uniform field curvature characteristics at a plurality of zoom positions. Accordingly, information pertaining to expressions (1) and (2) should be stored in correspondence to each of varying zoom positions set over predetermined intervals, and step S100 in FIG. 10A should be executed, instead of step S10 in FIG. 9, so as to read out the field curvature data for the photographic lens 1 corresponding to the currently selected zoom position from the nonvolatile memory 10. This makes it possible to optimally correct the defocus amount by taking into consideration the field curvature characteristics manifesting at the particular zoom position.

(Variation 3)

Figure 10B:
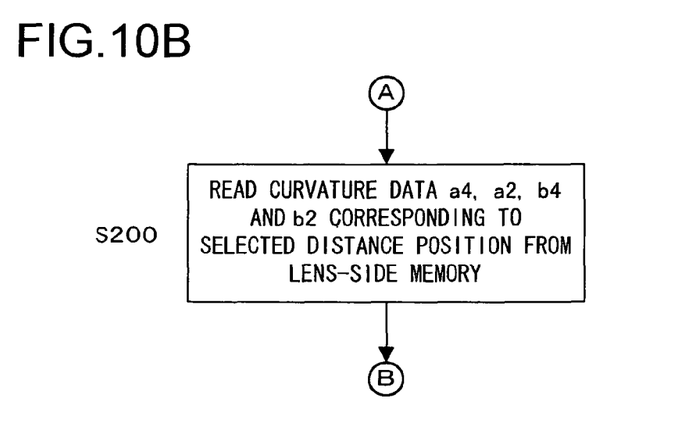

It is desirable to prepare in the nonvolatile memory 10 a plurality of sets of information pertaining to expressions (1) and (2) above, each in correspondence to a specific distance position. Under normal circumstances, it is difficult to achieve uniform field curvature characteristics over the full range of distance positions that may be assumed in conjunction with a zoom lens. Accordingly, information pertaining to expressions (1) and (2) should be stored in correspondence to each of varying distance positions set over predetermined intervals, and step S200 in FIG. 10B should be executed, instead of step S10 in FIG. 9, so as to read out the field curvature data for the photographic lens 1 corresponding to the currently selected distance position from the nonvolatile memory 10. This makes it possible to optimally correct the defocus amount by taking into consideration the field curvature characteristics manifesting at the particular distance position.

(Variation 4)

The present invention may also be adopted in a focus detection device that executes focus detection with an other phase difference detection sensor included therein, instead of executing focus detection through the image plane phase detection method described above. In such a case, information indicating a relative angle θ_a determined in correspondence to the pixel alignment direction (i.e., the shift amount detection direction) along which pixels are arrayed at the phase difference detection sensor included in the focus detection device, and an image height r_a assumed on the light receiving surface of the phase difference detection sensor, should be stored in advance in the nonvolatile memory 10. By setting the relative angle θ_a to 45(deg), the correction quantity can be adjusted to 0.

The above descriptions are examples and the present invention is not to be limited only to the embodiment and variations described above. The above described embodiments are examples, and various modifications can be made without departing from the scope of the invention.

What is claimed is:

1. A focus detection device, comprising:
a defocus information detection unit that detects phase difference information indicating a phase difference manifested by a pair of images formed with a pair of light fluxes having passed through different areas of a photographic optical system and detects defocus information based upon the phase difference information; and
a correction unit that executes correction for correcting the defocus information, detected by the defocus information detection unit, in correspondence to a predetermined direction extending between a first direction that orthogonally intersects an optical axis of the photographic optical system and radially extends from the optical axis and a second direction that orthogonally intersects the first direction.

2. A focus detection device according to claim 1, wherein:
the correction unit executes the correction based upon a phase difference detection direction along which the phase difference manifested by the pair of images is detected by the defocus information detection unit and an image height of the pair of images.

3. A focus detection device according to claim 2, wherein:
the correction unit executes the correction by using correction information corresponding to a first relative angle indicating the phase difference detection direction relative to the first direction and corresponding to the image height read out from a memory where the correction information is stored in advance.

4. A focus detection device according to claim 3, wherein:
the predetermined direction is equivalent to an angle that is half a second relative angle formed by the second direction relative to the first direction.

5. A focus detection device according to claim 4, wherein:
the angle that is half of the second relative angle is substantially equal to the first relative angle.

6. A focus detection device according to claim 3, wherein:
the correction information corresponding to the first relative angle and the image height is stored in the memory in correspondence to each of zoom positions that may be assumed by the photographic optical system or each of distance positions that may be assumed by the photographic optical system; and
the correction unit executes the correction by reading out from the memory the correction information corresponding to the each of distance positions or the each of zoom positions.

7. A focus detection device, comprising:
an image sensor that includes a focus detection pixel row, which outputs a pair of images formed with light fluxes resulting from pupil splitting achieved at an exit pupil of an optical system;
an image shift amount calculation unit that calculates an image shift amount indicating an extent of image shift manifested by the pair of images along an alignment direction assumed for the focus detection pixel row;
a defocus amount calculation unit that calculates a defocus amount based upon the image shift amount calculated by the image shift amount calculation unit;
a storage unit, in which a coefficient that defines a relationship between an field curvature manifesting at the optical system and an image height indicating a distance from an optical axis of the optical system to the focus detection pixel row that outputs the pair of images is stored;

a correction value calculation unit that calculates a correction value for the defocus amount based upon the image height, a relative angle formed by a straight line extending from the optical axis toward the focus detection pixel row that outputs the pair of images and the alignment direction, and the coefficient stored in the storage unit; and a drive quantity calculation unit that calculates a drive quantity indicating an extent to which the optical system needs to be driven to achieve focus adjustment for the optical system, based upon the defocus amount calculated by the defocus amount calculation unit and the correction value calculated by the correction value calculation unit.

* * * * *